(12) United States Patent
Kim et al.

(10) Patent No.: US 11,109,430 B2
(45) Date of Patent: *Aug. 31, 2021

(54) DISPLAY APPARATUS AND OPERATING CHANNEL SETTING METHOD FOR DISPLAY APPARATUS

(71) Applicant: SAMSUNG ELECTRONICS CO., LTD., Suwon-si (KR)

(72) Inventors: Jin-ho Kim, Gwangju-si (KR); Kyeong-chae Lim, Suwon-si (KR); Deok-nam Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

This patent is subject to a terminal disclaimer.

(21) Appl. No.: 16/544,121

(22) Filed: Aug. 19, 2019

(65) Prior Publication Data

US 2019/0379854 A1    Dec. 12, 2019

Related U.S. Application Data

(63) Continuation of application No. 15/853,092, filed on Dec. 22, 2017, now Pat. No. 10,432,887.

(30) Foreign Application Priority Data

Feb. 28, 2017    (KR) .......................... 10-2017-0026475

(51) Int. Cl.
*H04N 5/44*    (2011.01)
*H04W 76/14*    (2018.01)
(Continued)

(52) U.S. Cl.
CPC ........... *H04W 76/14* (2018.02); *H04L 67/104* (2013.01); *H04N 21/4126* (2013.01);
(Continued)

(58) Field of Classification Search
CPC ......... H04N 21/4222; H04N 21/43637; H04N 21/42204; H04N 21/4126; H04N 5/44;
(Continued)

(56) References Cited

U.S. PATENT DOCUMENTS 8,792,429 B2 *   7/2014   Hassan ................. G06F 3/0484
                                                                370/329
9,065,924 B2 *   6/2015   Le ..................... H04M 1/72412
(Continued)

FOREIGN PATENT DOCUMENTS

KR    10-2017-0099665 A    9/2017
WO    2017/146438 A1    8/2017

OTHER PUBLICATIONS

Communication dated Jul. 10, 2018 by the European Patent Office in counterpart European Patent Application No. 18153524.6.

*Primary Examiner* — Man U Phan
(74) *Attorney, Agent, or Firm* — Sughrue Mion, PLLC

(57) ABSTRACT

A display apparatus includes a processor configured to receive device information of a portable device, which includes first information about a wireless connection between the portable device and an access point and second information about whether the portable device supports a real simultaneous dual band (RSDB), acquire device information of the display apparatus, which includes third information about a wireless connection between the display apparatus and the access point and fourth information about whether the display apparatus supports the RSDB, determine a peer-to-peer (P2P) operating channel between the display apparatus and the portable device based on the device information of the display apparatus and the device information of the portable device, and control the display apparatus to connect the display apparatus to the portable device through the determined P2P operating channel.

18 Claims, 9 Drawing Sheets

(51) Int. Cl.
*H04L 29/08* (2006.01)
*H04N 21/41* (2011.01)
*H04N 21/422* (2011.01)
*H04N 21/4363* (2011.01)

(52) U.S. Cl.
CPC . *H04N 21/42204* (2013.01); *H04N 21/43637* (2013.01); *H04N 21/4222* (2013.01)

(58) Field of Classification Search
CPC .. H04N 21/41; H04N 21/422; H04N 21/4363; H04W 76/14; H01L 67/104; H01L 29/08
USPC .......................................................... 370/329
See application file for complete search history.

(56) References Cited

U.S. PATENT DOCUMENTS

| | | | |
|---|---|---|---|
| 9,198,213 B2 * | 11/2015 | Kim | H04W 76/14 |
| 9,271,322 B2 * | 2/2016 | Vaidya | H04W 76/15 |
| 9,385,773 B2 * | 7/2016 | Vaidya | H04L 45/66 |
| 9,392,630 B2 * | 7/2016 | Yi | H04W 74/04 |
| 9,538,539 B2 | 1/2017 | Rajamani et al. | |
| 9,538,568 B2 * | 1/2017 | Lee | H04W 72/048 |
| 9,807,540 B2 | 10/2017 | Ray et al. | |
| 9,923,583 B2 | 3/2018 | Choudhary et al. | |
| 9,936,372 B2 * | 4/2018 | Lee | H04W 76/14 |
| 9,992,775 B2 | 6/2018 | Katar et al. | |
| 10,075,517 B2 * | 9/2018 | Kim | H04W 72/06 |
| 10,111,158 B2 * | 10/2018 | Lim | H04W 48/14 |
| 10,129,878 B2 * | 11/2018 | Sharma | H04W 72/0453 |
| 10,425,888 B2 * | 9/2019 | Nishida | H04W 24/02 |
| 10,582,435 B2 * | 3/2020 | Srivastava | H04W 36/30 |
| 10,602,514 B2 * | 3/2020 | Kim | H04W 72/0453 |
| 10,674,555 B2 * | 6/2020 | Bang | H04W 76/23 |
| 10,743,358 B1 * | 8/2020 | Mullati | H04W 76/15 |
| 10,749,974 B2 * | 8/2020 | Qi | H04L 67/16 |
| 2014/0369246 A1 | 12/2014 | Vaidya et al. | |
| 2015/0245285 A1 | 8/2015 | Kwon et al. | |
| 2016/0233902 A1 | 8/2016 | Choudhary et al. | |
| 2016/0353301 A1 | 12/2016 | Kim | |
| 2017/0013055 A1 | 1/2017 | Lim et al. | |
| 2017/0245276 A1 | 8/2017 | Kim et al. | |
| 2020/0120453 A1 * | 4/2020 | Kim | H04W 48/16 |
| 2020/0288521 A1 * | 9/2020 | Bang | H04W 8/005 |
| 2020/0301720 A1 * | 9/2020 | Choi | G06F 9/44505 |
| 2020/0382172 A1 * | 12/2020 | Sethuraman | H04B 7/0697 |

* cited by examiner

FIG. 5

| Case | Pre-condition | WHETHER TO SUPPORT RSDB | | | |
|---|---|---|---|---|---|
| | | TV: NO<br>Peer: NO | TV: NO<br>Peer: YES | TV: YES<br>Peer: NO | TV: YES<br>Peer: YES |
| 1-1 | 510 | 511 | 513 | | |
| 1-2 | 520 | 521 | 523 | | |
| 1-3 | 530 | 531 | 533 | 535 | 537 |
| 1-4 | 540 | 541 | 543 | 545 | 547 |

FIG. 7

| Case | Pre-condition | WHETHER TO SUPPORT RSDB | | | |
|---|---|---|---|---|---|
| | | TV: NO<br>Peer: NO | TV: NO<br>Peer: YES | TV: YES<br>Peer: NO | TV: YES<br>Peer: YES |
| 2-1 | 710 | 711 | 713 | — | 717 |
| 2-2 | 720 | 721 | 723 | 727 | — |
| 2-3 | 730 | 731 | 733 | 737 | — |
| 2-4 | 740 | 741 | 743 | 745 | 747 |

FIG. 9

| Case | Pre-condition | WHETHER TO SUPPORT RSDB | | |
|---|---|---|---|---|
| | | TV: NO<br>Peer: NO | TV: NO<br>Peer: YES | TV: YES<br>Peer: NO | TV: YES<br>Peer: YES |
| 3-1 | 910 | 911 | 913 | | |
| 3-2 | 920 | 921 | 923 | | |
| 3-3 | 930 | 931 | 933 | 935 | 937 |

DISPLAY APPARATUS AND OPERATING CHANNEL SETTING METHOD FOR DISPLAY APPARATUS

CROSS-REFERENCE TO RELATED APPLICATION

This application is a continuation of U.S. patent application Ser. No. 15/853,092, filed on Dec. 22, 2017, now U.S. Pat. No. 10,432,887 issued on Oct. 1, 2019, in the U.S. Patent and Trademark Office, which claims priority from Korean Patent Application No. 10-2017-0026475, filed on Feb. 28, 2017, in the Korean Intellectual Property Office, the disclosures of which are incorporated herein by reference in their entireties.

BACKGROUND

1. Field

Apparatuses and methods consistent with exemplary embodiments relate to a display apparatus and an operating channel setting method for the display apparatus, and more particularly, to a display apparatus considering a concurrent connection of Wi-Fi Direct (WFD)-connectable portable devices and an operating channel setting method for the display apparatus.

2. Description of the Related Art

Wi-Fi Direct (WFD) technology may provide a peer-to-peer (P2P) protocol without a network infrastructure device (e.g., an access point or a router) when devices supporting Wi-Fi are directly connected.

Through WFD technology, portable devices (e.g., smartphones, cellular phones, personal digital assistants (PDAs), tablet personal computers (PCs), laptop PCs, and electronic organizers) as well as display apparatuses (e.g., a TV) having a display may mutually transmit or share content (e.g., text, an image, a video, a game, or a document).

A P2P operating channel used for a WFD connection is determined when a P2P group is created. For example, when a WDF connection between a display apparatus and a portable device is established, a device supposed to act as a group owner (GO) (e.g., the display apparatus) may select the P2P operating channel.

The P2P operating channel may influence the wireless network performance (e.g., throughput or packet loss) according to a WFD connection configuration. An optimal operating channel needs to be set between devices supporting WFD technology to efficiently use a wireless bandwidth.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a method of setting an optimal peer-to-peer (P2P) operating channel between a display apparatus and a portable device according to whether the display apparatus is connected to an access point, whether the portable device is connected to the access point, and whether the display apparatus and the portable device support a real simultaneous dual band (RSDB). Further, one or more exemplary embodiments provide the display apparatus that may perform the method to set the optimal PSP operating channel between the display apparatus and the portable device.

According to an aspect of an exemplary embodiment, there is provided a display apparatus including: a communication interface configured to be wirelessly connected to at least one of a first access point and a portable device; and a processor configured to receive device information of the portable device, which comprises first information about a wireless connection between the portable device and the first access point or a second access point and second information about whether the portable device supports a real simultaneous dual band (RSDB), from the portable device, acquire device information of the display apparatus, which includes third information about a wireless connection between the display apparatus and the first access point and fourth information about whether the display apparatus supports the RSDB, determine a peer-to-peer (P2P) operating channel between the display apparatus and the portable device based on the device information of the display apparatus and the device information of the portable device, and control the display apparatus to connect the display apparatus to the portable device through the determined P2P operating channel.

The display apparatus, the portable device, and the first or second access point may be connected to each other through any one or any combination of a single channel concurrency, a multi-channel concurrency connection, and an RSDB connection, and the processor may be further configured to determine the P2P operating channel that minimizes a number of the multi-channel concurrency connection.

Operable channels of the display apparatus may include a first frequency band and a second frequency band that is higher than the first frequency band, the processor may be further configured to set the P2P operating channel as the second frequency band to minimize the number of the multi-channel concurrency connection.

When the portable device is wirelessly connected to the first or second access point at the first frequency band and supports the RSDB, the processor may be further configured to set the P2P operating channel as the second frequency band.

The first frequency band may correspond to a 2.4-GHz band, and the second frequency band may correspond to a 5-GHz band.

The first information may include information about whether the portable device is connected to the first access point or the second access point, and when the portable device is connected to the first access point or the second access point, information about the first access point or the second access point that is connected to the portable device, an operating channel frequency band of the portable device, and an operating channel number of the portable device.

The processor may be further configured to set the display apparatus as a group owner based on the device information of the display apparatus and the device information of the portable device.

The processor may be further configured to transmit, to the portable device, a group owner negotiation request message or an invitation request message, which includes an operating channel selected from among available channels of the display apparatus, and receive, from the portable device, a group owner negotiation response message including an operating channel of the portable device.

The available channel may include an available channel list stored in a storage, and when the display apparatus is connected to the first access point, an operating channel frequency band and an operating channel number.

The processor may be further configured to control the display apparatus to update the device information before the display apparatus is wirelessly connected to the portable device.

According to an aspect of another exemplary embodiment, there is provided an operating channel setting method for a display apparatus, including: receiving device information of a portable device, which comprises first information about a wireless connection between the portable device and a first access point and second information about whether the portable device supports a real simultaneous dual band (RSDB), from the portable device; acquiring device information of the display apparatus, which comprises third information about a wireless connection between the display apparatus and the first access point or a second access point, and fourth information about whether the display apparatus supports the RSDB; determining a peer-to-peer (P2P) operating channel between the display apparatus and the portable device based on the device information of the display apparatus and the device information of the portable device; and controlling the display apparatus to connect the display apparatus to the portable device through the determined P2P operating channel.

The display apparatus, the portable device, and the first or second access point may be connected to each other through any one or any combination of a single channel concurrency connection, a multi-channel concurrency connection, and an RSDB connection, and the determining the P2P operating channel may include determining the P2P operating channel that minimizes a number of the multi-channel concurrency connection.

Operable channels of the display apparatus may include a first frequency band and a second frequency band that is higher than the first frequency band, and the determining the P2P operating channel may include determining the P2P operating channel at the second frequency band to minimize the number of multi-channel concurrency connection.

The determining the P2P operating channel may include determining the P2P operating channel as the second frequency band when the portable device is wirelessly connected to the first or second access point at the first frequency band and supports the RSDB.

The first frequency band may correspond to a 2.4-GHz band, and the second frequency band may correspond to a 5-GHz band.

The first information may include information about whether the portable device is connected to the first access point or the second access point, and when the portable device is connected to the access point or the second access point, information about the first access point or the second access point, an operating channel frequency band of the portable device, and an operating channel number of the portable device.

The determining the P2P operating channel may include setting the display apparatus as a group owner based on the device information of the display apparatus and the device information of the portable device.

The determining the P2P operating channel include: transmitting, to the portable device, a group owner negotiation request message or an invitation request message, which comprises an operating channel selected from among available channels of the display apparatus; and receiving, from the portable device, a group owner negotiation response message including an operating channel of the portable device.

The available channel may include an available channel list stored in a storage, and when the display apparatus is connected to the first or second access point, an operating channel frequency band and an operating channel number.

According to an aspect of another exemplary embodiment, there is provided a non-transitory computer-readable storage medium storing a program that is executable by a computer to perform the operating channel setting method.

According to an aspect of another exemplary embodiment, there is provided an electronic device that supports a real simultaneous dual band (RSDB), the electronic device including: a processor configured to determine whether an external device that is connected to an access point supports the RSDB, identify an operating channel between the external device and the access point, and determine a point-to-point (P2P) operating channel between the electronic device and the external device from a plurality of operable channels based on a determination of whether the external device supports the RSDB and the identified operating channel between the external device and the access point; and a communication interface configured to connect the electronic device to the external device through the determined P2P operating channel.

The processor may be further configured to set the P2P operating channel to an operating channel between the electronic device and the access point or another access point to which the electronic device is connected, in response to determining that the external device supports the RSDB and the operating channel between the external device and the access point is identical to the operating channel between the electronic device and the access point or the other access point.

The processor may be further configured to set the P2P operating channel to an operating channel between the electronic device and the access point or another access point to which the electronic device is connected, in response to determining that the external device supports the RSDB and the operating channel between the external device and the access point corresponds to a frequency band lower than a frequency band of the operating channel between the electronic device and the access point or the other access point.

The processor may be further configured to set the P2P operating channel to a default channel of the electronic device, in response to determining that the external device supports the RSDB, the operating channel between the external device and the access point is within a frequency band higher than a frequency band corresponding to the default channel, and the operating channel between the external device and the access point is different from an operating channel between the electronic device and the access point or another access point to which the electronic device is connected.

The processor may be further configured to set the P2P operating channel to the operating channel between the external device and the access point, in response to determining that the external device does not support the RSDB, and the operating channel between the external device and the access point is within a frequency band lower than a frequency band corresponding to an operating channel between the electronic device and the access point or another access point to which the electronic device is connected.

BRIEF DESCRIPTION OF THE DRAWINGS

The above and/or other aspects will be more apparent by describing certain exemplary embodiments, with reference to the accompanying drawings, in which:

FIG. 5 is a particular example of an operating channel setting method when the display apparatus 100 is wirelessly connected to an access point 300 having an operating channel in a 5-GHz band, according to an exemplary embodiment;

FIG. 7 is a particular example of an operating channel setting method when the display apparatus 100 is wirelessly connected to the access point 300 having an operating channel in a 2.4-GHz band, according to an exemplary embodiment;

FIG. 9 is a particular example of an operating channel setting method when the display apparatus 100 is not wirelessly connected to the access point 300, according to an exemplary embodiment.

DETAILED DESCRIPTION

Figure 1:
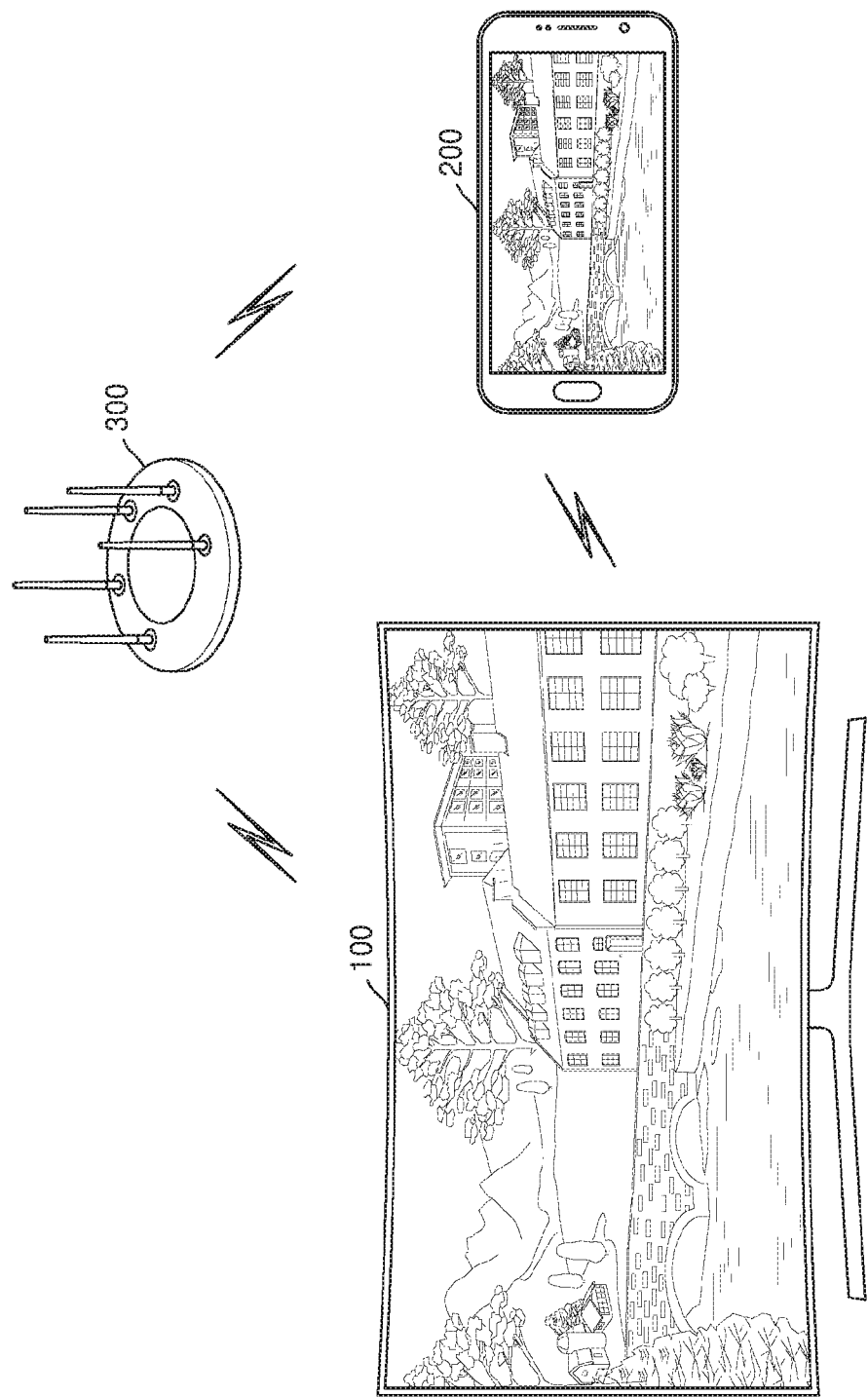
FIG. 1 schematically illustrates an operation between a display apparatus 100 and a portable device 200, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Although terms, such as 'first' and 'second', can be used to describe various elements, the elements cannot be limited by the terms. The terms can be used to classify a certain element from another element. For example, a first element can be named a second element without leaving from the right scope of the inventive concept, and likely the second element can be named the first element. The term "and/or" includes any and all combinations of one or more of the associated listed items.

The term "application" indicates software to be executed on an operating system (OS) for a display apparatus, an OS for a computer, or a mobile OS for a portable device and used by a user. An application (e.g., an application enabling a peer-to-peer (P2P) operating channel to be set) according to an exemplary embodiment may indicate software executable in a display apparatus, a portable device, and an external device (e.g., a server) connected to the portable device in a wireless or wired manner. The application (e.g., an application enabling a peer-to-peer (P2P) operating channel to be set) according to an exemplary embodiment may indicate software allowing a display apparatus, in which the application is installed, to control a function or operation of an external device (e.g., a server or a portable device) connected thereto in a wireless or wired manner. In addition, software corresponding to the P2P operating channel setting according to an exemplary embodiment may be implemented as an OS, an application, firmware, or the like.

In the exemplary embodiments, the term "user" may indicate a person who controls a function or operation of a display apparatus 100 or a person who controls a function or operation of a portable device 200. The user may include a manager or an installation engineer.

The terminology used in the application is used only to describe embodiments and does not have any intention to restrict and/or limit the inventive concept. An expression in the singular includes an expression in the plural unless they are clearly different from each other in context. In the application, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

As used herein, expressions such as "at least one of," when preceding a list of elements, modify the entire list of elements and do not modify the individual elements of the list.

FIG. 1 schematically illustrates an operation between the display apparatus 100 and the portable device 200, according to an exemplary embodiment.

Referring to FIG. 1, the display apparatus 100 may be connected to the portable device 200 via a wireless communication, such as Wi-Fi Direct (WFD), Bluetooth, or long term evolution (LTE) direct. Hereinafter, a case in which the display apparatus 100 and the portable device 200 are connected by the WFD scheme will be described, but the type of wireless communication that connects the display apparatus 100 to the portable device 200 is not limited to WFD.

As shown in FIG. 1, the display apparatus 100 and the portable device 200 may be connected to each other via a point-to-point (P2P) wireless communication (e.g., WFD).

When the display apparatus 100 and the portable device 200 are connected to each other via WFD, only one of the display apparatus 100 and the portable device 200 may need to be wirelessly connected to an access point 300. For example, either the display apparatus 100 or the portable device 200 may be wireless connected to the access point 300, or both the display apparatus 100 and the portable device 200 may be wireless connected to the access point 300.

Although the display apparatus 100 and one portable device 200 are shown in FIG. 1, the display apparatus 100 may be connected to each of a plurality of portable devices, according to exemplary embodiments.

In addition, although FIG. 1 shows that the display apparatus 100 and the portable device 200 are connected to the same access point (AP) 300, the display apparatus 100 and the portable device 200 may be respectively connected to different access points 300.

For a connection between devices through WFD, a device discovery and connection request process and a group formation process may be performed according to an exemplary embodiment.

First, in the device discovery and connection request process, the display apparatus 100 and the portable device

200 scan a counterpart device supporting WFD and exchange device information with the counterpart device.

The device information may include wireless connection information stored in the display apparatus 100 and the portable device 200 and concurrent connection methods (e.g., multi-channel concurrency and real simultaneous dual band (RSDB) connection) supported by a corresponding device.

For example, the wireless connection information may include whether the corresponding device is connected to the AP 300 and when the corresponding device is connected to the AP 300, information about the connected AP 300, an operating channel frequency band, and an operating channel number.

According to an exemplary embodiment, the device information may be updated to latest information before a wireless connection. In addition, the device information may be stored in the display apparatus 100 and the portable device 200 in a vendor specific information element (VSIE) format.

Next, in the group formation process, a group owner (GO) negotiation is performed to determine which one of the display apparatus 100 and the portable device 200 is a group owner GO acting as a virtual AP.

The display apparatus 100 and the portable device 200 may exchange a GO intent value therebetween during the GO negotiation. The display apparatus 100 and the portable device 200 may determine the group owner GO by using set GO intent values (e.g., 0 to 15). The other device (hereinafter, referred to as "group client") which has not been determined as the group owner GO may operate as a group client (or a P2P client or a P2P group client).

In the group formation process according to an exemplary embodiment, the display apparatus 100 may be determined as the group owner GO. The portable device 200 may be determined as the group client. According to an exemplary embodiment, the group client is not limited to the portable device 200. The group client may indicate an electronic device which is determined as a group client by being connected to the group owner GO via WFD. In addition, according to another exemplary embodiment, the portable device 200 may be determined as the group owner GO.

During the GO negotiation, the group owner GO may receive operating channel information of the group client.

For example, the display apparatus 100 may select an operating channel from an available operating channel list. The display apparatus 100 may transmit a GO negotiation request message or an invitation request message, which includes the operating channel selected from the available operating channel list, to the portable device 200.

The display apparatus 100 may receive a GO negotiation response message including an operating channel of the portable device 200 from the portable device 200 after transmitting the GO negotiation request message or the invitation request message.

The operating channel of the portable device 200 may be, for example, a preferred operating channel of the portable device 200. The preferred operating channel of the portable device 200 may be the same as or differ from an operating channel to be used for a wireless connection with the AP 300 when the portable device 200 is connected to the AP 300.

After completing the device discovery and connection request process and the group formation process, the display apparatus 100 determined as the group owner GO may be wirelessly connected to the portable device 200 determined as the group client, through the selected operating channel.

An application (e.g., a WFD-based service) for data transmission between the display apparatus 100 and the portable device 200 may provide a seamless service when a sufficient wireless bandwidth is guaranteed. In a WFD connection process, an operation which most influences the wireless network performance may be setting an operating channel of the portable device 200. The operating channel may include a 2.4-GHz band and a 5-GHz band. The 5-GHz band having relatively less interference than the 2.4-GHz band may be better for the WFD connection performance.

The display apparatus 100 and the portable device 200 may support concurrent connection. The concurrent connection indicates that a certain device is wirelessly connected to two other devices at the same time.

The concurrent connection may include single channel concurrency, multi-channel concurrency, and an RSDB connection.

Hereinafter, the single channel concurrency indicates that, when a device which supports or does not support an RSDB is wirelessly connected to two devices at the same time, frequency bands and operating channel numbers of two operating channels used for the wireless connections are the same.

In addition, the multi-channel concurrency indicates that, when a device which does not support the RSDB is wirelessly connected to two devices at the same time, frequency bands and/or operating channel numbers of two operating channels used for the wireless connections are different from each other.

For example, when the portable device 200 connected to the AP 300 through a channel in the 2.4-GHz band is newly connected to the display apparatus 100 through a WFD operating channel in the 5-GHz band, the multi-channel concurrency may occur in the portable device 200 simultaneously connected to two devices.

According to an exemplary embodiment, when the multi-channel concurrency occurs in one of the display apparatus 100 and the portable device 200, the wireless network performance of the multi-channel concurrency may be lower than the wireless network performance of the single channel concurrency since WFD operating channels of different frequency bands have to be used by a time division scheme.

In addition, the RSDB connection indicates that, when a device supporting the RSDB is wirelessly connected to two devices at the same time, frequency bands of two operating channels used for the wireless connections are different from each other. The RSDB connection may enable client devices and routers to transmit data over two or more different bands simultaneously.

In this regard, at least one of the display apparatus 100 and the portable device 200 may support the RSDB connection. The RSDB connection indicates a technique in which a Wi-Fi module supporting multiple input multiple output (MIMO) can transmit and receive data by being simultaneously connected at different frequency bands (e.g., 5 GHz and 2.4 GHz). The wireless network performance when a device supporting the RSDB connection is connected by means of WFD at 5-GHz and 2.4-GHz bands may be the performance in the single channel concurrency or better.

In the connection between the group owner GO and the group client through the WFD scheme, the multi-channel concurrency which may occur between the group owner GO and the group client needs to be minimized. If the multi-channel concurrency is mandatory in the connection between the group owner GO and the group client through the WFD scheme, an operating channel in the 5-GHz band may be preferably set between the group owner GO and the group client.

In the connection between the group owner GO and the group client through the WFD scheme, the group owner GO may set a P2P operating channel between the group owner GO and the group client based on whether the group owner GO and the group client are connected to the AP 300 and whether the group owner GO and the group client support the RSDB connection.

Figure 2:
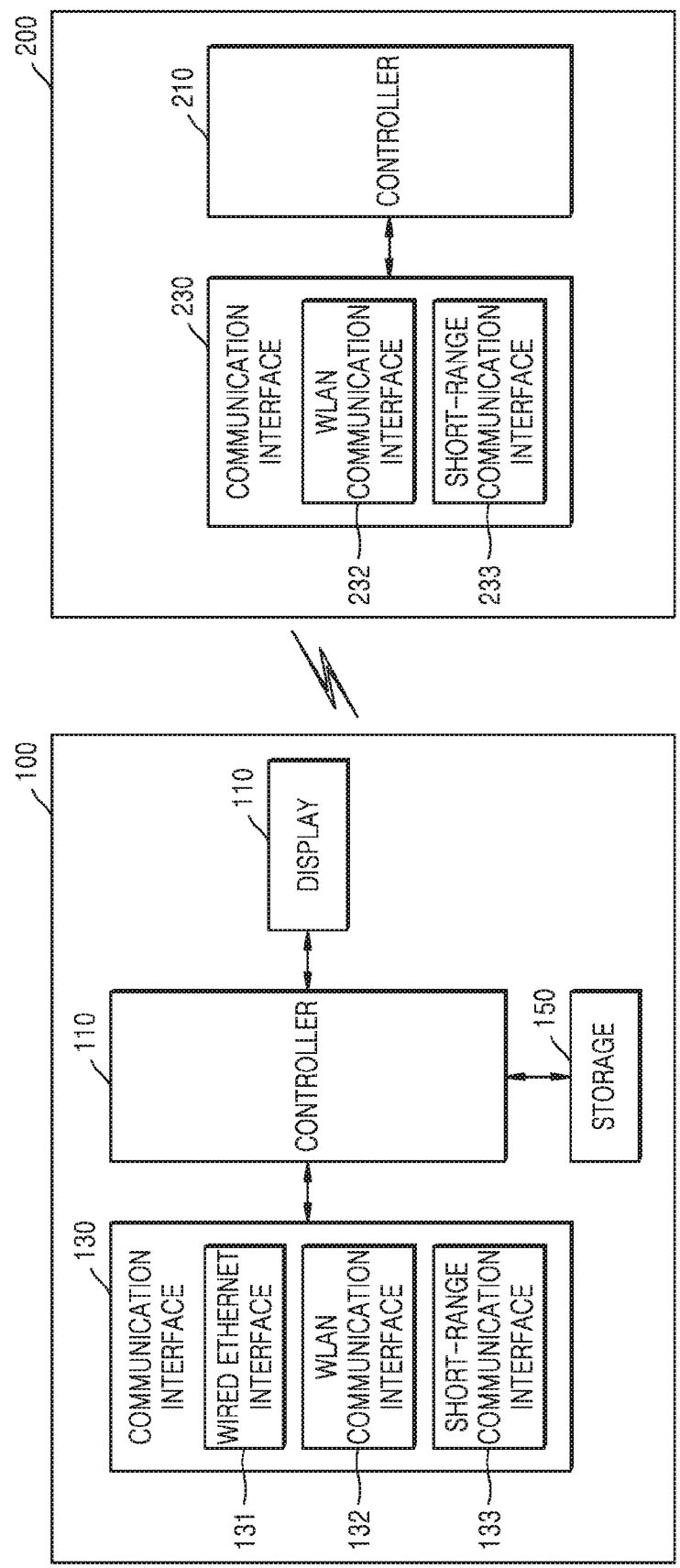
FIG. 2 is a block diagram of the display apparatus 100 and the portable device 200, according to an exemplary embodiment.

FIG. 2 is a block diagram of the display apparatus 100 and the portable device 200, according to an exemplary embodiment.

Referring to FIG. 2, the display apparatus 100 may be connected to the portable device 200 through a communication interface 130. In addition, the display apparatus 100 may be connected to one or a plurality of portable devices 200 through the WFD scheme.

The display apparatus 100 may include a controller 110, the communication interface 130, a storage 150, and a display 170.

The controller 110 may include a processor. The processor may include a graphic processing unit (GPU). The processor may be implemented by a system on chip (SoC) in which a core and the GPU are integrated. In addition, the controller 110 may further include a read only memory (ROM) (or a nonvolatile memory) in which a control program for controlling the display apparatus 100 is stored, and a random access memory (RAM) (or a volatile memory) which stores a signal or data input from the outside of the display apparatus 100 or is used as storage regions corresponding to various tasks performed by the display apparatus 100.

The controller 110 may store device information of the display apparatus 100, which includes wireless connection information for the display apparatus 100 and the AP 300 and information about whether the display apparatus 100 supports the RSDB, in the storage 150.

The wireless connection information for the display apparatus 100 and the AP 300 may include whether the display apparatus 100 is connected to the AP 300, a basic service set identifier (BSSID) of the AP 300, an operating channel frequency band (AP frequency band) used for a wireless connection between the display apparatus 100 and the AP 300, an operating channel number used for the wireless connection between the display apparatus 100 and the AP 300, and the like.

The controller 110 may update the wireless connection information for the display apparatus 100 and the AP 300 and the information about whether the display apparatus 100 supports the RSDB, before a wireless connection.

According to an exemplary embodiment, the controller 110 may store the device information in a VSIE format.

Table 1 illustrates one example of a VSIE. The VSIE may be used as the same meaning as a P2P information element. Table 2 illustrates one example of a vendor specific capability attribute.

TABLE 1

Vendor Specific Information Element Format

| Field | Size (octets) | Value | Description |
| --- | --- | --- | --- |
| TAG NUMBER | 1 | 0xDD | Vendor Specific |
| TAG LENGTH | 1 | Variable | |

TABLE 1-continued

Vendor Specific Information Element Format

| Field | Size (octets) | Value | Description |
| --- | --- | --- | --- |
| OUI | 3 | 0x0000F0 | SAMSUNG Electronics |
| Vendor Specific OUI TYPE | 1 | 0xXX | Samsung Vendor Specific IE |
| Vendor Specific Data | variable | | One of more attributes appear in this vendor specific IE |

TABLE 2

Vendor Specific Capability Attribute

| Field | Size (octets) | Value | Description |
| --- | --- | --- | --- |
| Attribute ID | 1 | 0x00 | Vendor Specific Capability information |
| Length | 2 | 0x0001 | 1 byte |
| Vendor Specific Capability Bitmap | 1 | variable | 0 bit: AP connected (1: connected, 0: disconnected) 1 bit: RSDB Support (1: RSDB support, 0: RSDB non-support) |

Herein, the VSIE may include a plurality of items indicating a tag number, a tag length, an organization unique identification (OUI), a vendor specific OUI type, vendor specific data, and the like.

In addition, the vendor specific capability attribute may include a plurality of items indicating an attribute identification (ID), a length, a vendor specific capability bitmap, and the like. The VSIE and the vendor specific capability attribute may include items indicating various pieces of information without being limited to the items illustrated in Tables 1 and 2.

In addition, the device information of the display apparatus 100 may be the VSIE but is not limited thereto and may include various formats of data including the wireless connection information for the display apparatus 100 and the AP 300 and the information about whether the display apparatus 100 supports the RSDB.

The controller 110 may receive device information of the portable device 200 from the portable device 200.

The device information of the portable device 200 may include wireless connection information for the portable device 200 and the AP 300 and information about whether the portable device 200 supports the RSDB. The device information of the portable device 200 may include various formats of data including the wireless connection information for the portable device 200 and the AP 300 and the information about whether the portable device 200 supports the RSDB.

In addition, the controller 110 may acquire the device information of the display apparatus 100, which is stored in the storage 150.

The controller 110 may determine a P2P operating channel between the display apparatus 100 and the portable device 200 based on the device information of the display apparatus 100 and the device information of the portable device 200.

The controller 110 may control the display apparatus 100 such that the display apparatus 100 and the portable device 200 are connected by the WFD scheme through the determined P2P operating channel.

The controller 110 may determine the P2P operating channel such that the number of multi-channel concurrency cases is minimized.

When the P2P operating channel determined such that the number of multi-channel concurrency cases is minimized includes a first frequency band and a second frequency band that is higher than the first frequency band, the controller 110 may determine the P2P operating channel at the second frequency band.

When the portable device 200 is wirelessly connected to the AP 300 at the first frequency band and supports the RSDB, the controller 110 may determine the P2P operating channel at the second frequency band.

Herein, the first frequency band may include the 2.4-GHz band, and the second frequency band may be the 5-GHz band. The 2.4 GHz band may provide broader coverage but may transmit data at lower speeds, compared to the 5 GHz band. The 5 GHz band may allow the display apparatus 100 to communicate with the portable device 200 faster than the 2.4 GHz.

The controller 110 may control the display apparatus 100 such that the display apparatus 100 is set as a group owner GO, based on the device information of the display apparatus 100 and the device information of the portable device 200.

The controller 110 may transmit a GO negotiation request message or an invitation request message, which includes an operating channel selected from among available channels of the display apparatus 100, to the portable device 200.

The available channel may include an available channel list stored in the storage 150 and, when the display apparatus 100 is connected to the AP 300, an operating channel frequency band and an operating channel number.

The controller 110 may receive a GO negotiation response message including an operating channel of the portable device 200 from the portable device 200.

The communication interface 130 may wirelessly connect the display apparatus 100 to at least one of the portable device 200 and the AP 300 under control of the controller 110. The communication interface 130 may wirelessly connect the display apparatus 100 to at least one of the portable device 200 and the AP 300 according to a user's input.

In addition, the communication interface 130 may receive the device information of the portable device 200, which is transmitted from the portable device 200, under control of the controller 110.

The communication interface 130 may include a wired Ethernet interface 131, a wireless local area network (WLAN) communication interface 132, and a short-range communication interface 133, taken alone or in combination.

The WLAN communication interface 132 may be configured to perform WFD communication with the portable device 200. The WLAN communication interface 132 may be further configured to perform Wi-Fi communication or WFD communication with the AP 300.

The short-range communication interface 133 may further include a Bluetooth communication interface, a Bluetooth low energy (BLE) communication interface, an infrared data association (IrDA) communication interface, an ultra-wide-band (UWB) communication interface, a magnetic security transmission (MST) communication interface, a near field communication (NFC) interface, or the like.

The storage 150 may store various data, programs, or applications for operating and controlling the display apparatus 100 under control of the controller 110. The storage 150 may store input/output signals or data corresponding to an operation of the communication interface 130 and the display 170.

The storage 150 may store control programs for controlling the display apparatus 100 and the controller 110, applications initially provided by a manufacturer or downloaded from the outside, a graphical user interface (hereinafter, referred to as "GUI") related to the applications, an object (e.g., an image text, an icon, or a button) for providing the GUI, user information, documents, databases, and relevant data.

The storage 150 may store the device information of the display apparatus 100 under control of the controller 110. In addition, the storage 150 may store the device information of the portable device 200, which has been received from the portable device 200, under control of the controller 110.

The display 170 displays a video or an image under control of the controller 110.

According to an exemplary embodiment, the display 170 may display a visual feedback corresponding to P2P operating channel setting between the display apparatus 100 and the portable device 200. According to another exemplary embodiment, the display 170 may be separated from the display apparatus 100.

Referring to FIG. 2, the portable device 200 may be connected to the display apparatus 100 through a communication interface 230 in a wired or wireless manner, under control of the controller 210.

The portable device 200 may be connected to the display apparatus 100 via WFD. In addition, the portable device 200 may be determined as a group owner GO or a group client to be connected to the display apparatus 100 via WFD, under control of the controller 210.

The portable device 200 may transmit or receive data to or from the display apparatus 100 through the communication interface 230 supporting the WFD scheme, under control of the controller 210.

For example, the portable device 200 may be implemented by a cellular phone, a smartphone, a camera, an MP3 player, a video player, a tablet PC, a body-mountable (or attachable or implantable) wearable device, an electronic bulletin board, a home appliance (e.g., a refrigerator, an air conditioner, a cleaner, or a speaker), or the like.

Referring to FIG. 2, the communication interface 230 may include a WLAN communication interface 232 and a short-range communication interface 233.

The communication interface 230 may receive the device information of the display apparatus 100, which is transmitted from the display apparatus 100, under control of the controller 210. In addition, the communication interface 230 may transmit the device information of the portable device 200, under control of the controller 210.

Figure 3:
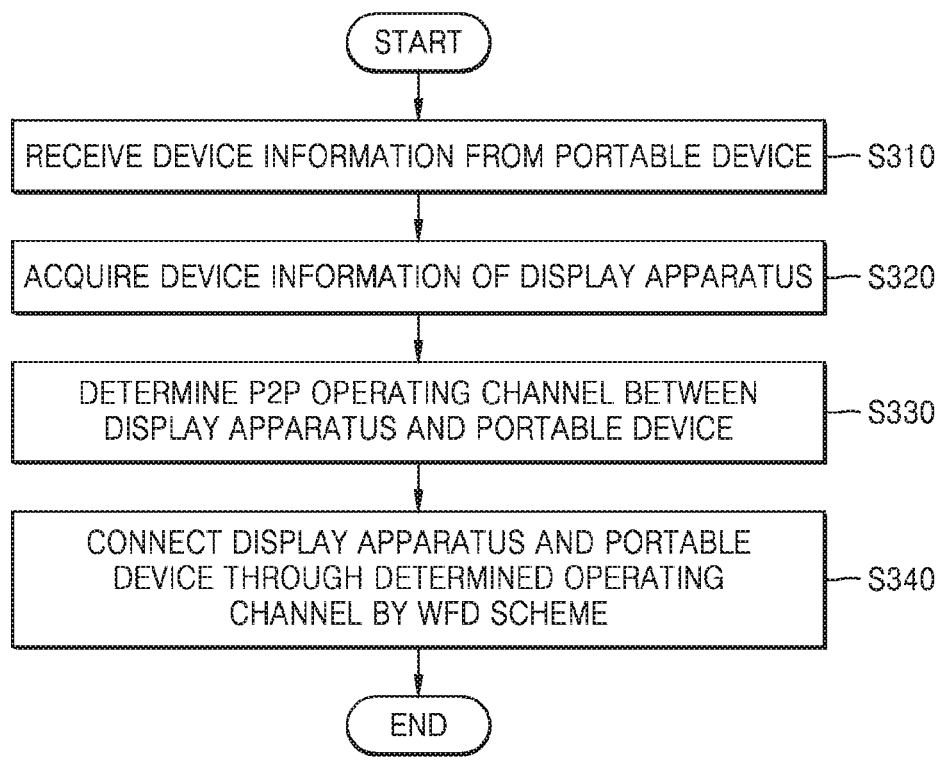
FIG. 3 is a flowchart of an operating channel setting method for the display apparatus 100, according to an exemplary embodiment.

FIG. 3 is a flowchart of an operating channel setting method for the display apparatus 100, according to an exemplary embodiment.

In operation S310, the display apparatus 100 may receive the device information of the portable device 200 from the portable device 200. The device information of the portable device 200 may include the wireless connection information for the portable device 200 and the AP 300 and the information about whether the portable device 200 supports the RSDB.

In operation S320, the display apparatus 100 may acquire the device information of the display apparatus 100. The device information of the display apparatus 100 may include the wireless connection information for the display apparatus 100 and the AP 300 and the information about whether the display apparatus 100 supports the RSDB.

In operation S330, the display apparatus 100 may determine a P2P operating channel between the display apparatus 100 and the portable device 200.

For example, the display apparatus 100 may determine the P2P operating channel between the display apparatus 100 and the portable device 200 based on the device information of the display apparatus 100 and the device information of the portable device 200.

In operation S340, the display apparatus 100 may control a connection of the display apparatus 100 and the portable device 200 such that the display apparatus 100 and the portable device 200 are connected by the WFD scheme through the determined P2P operating channel.

Figure 4:
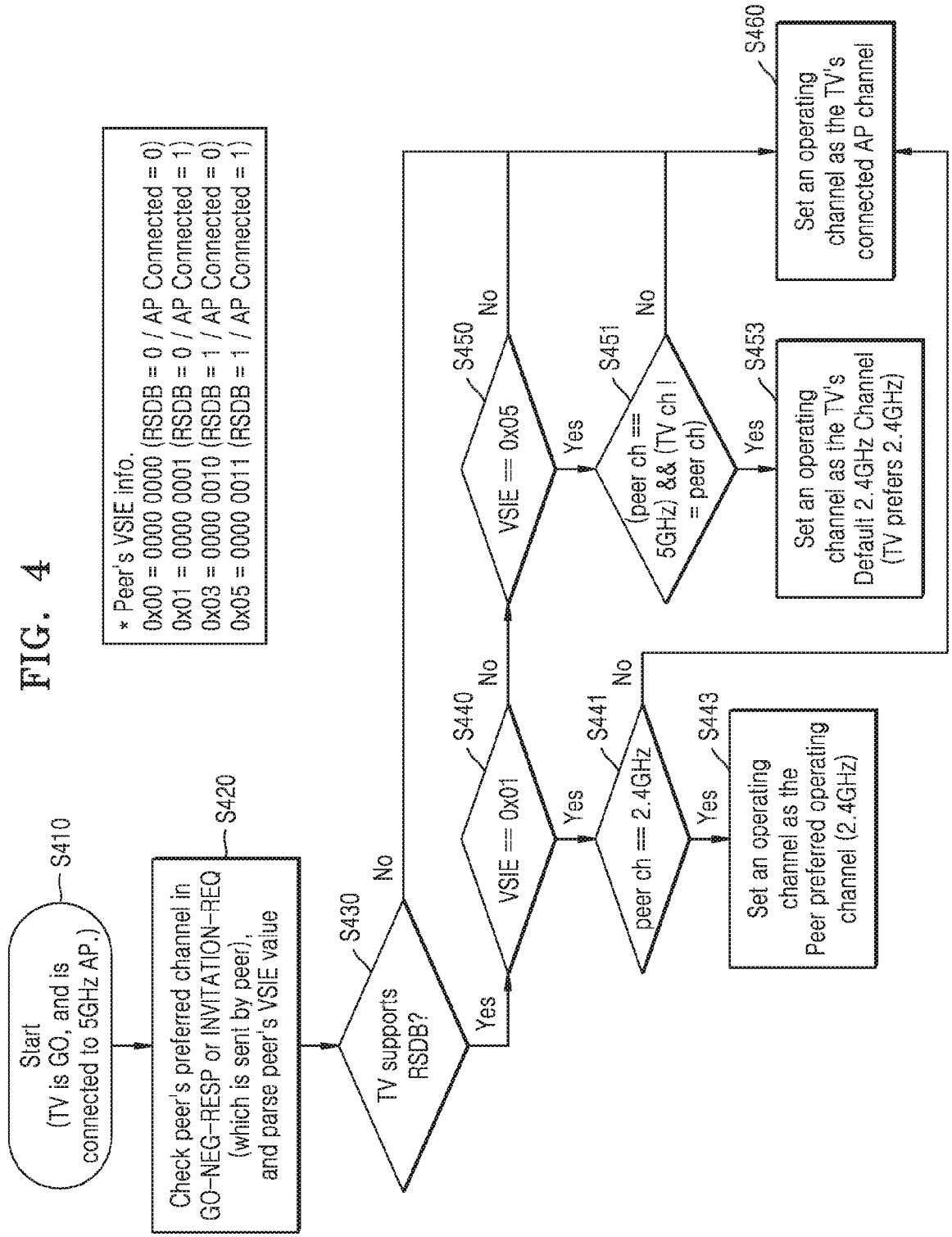
FIG. 4 is a flowchart of an operating channel setting method for the display apparatus 100, according to an exemplary embodiment.

FIG. 4 is a flowchart of an operating channel setting method for the display apparatus 100, according to an exemplary embodiment.

FIG. 4 shows that a P2P operating channel between the display apparatus 100 and the portable device 200 is set when the display apparatus 100 is connected to the AP 300 having an operating channel in the 5-GHz band.

The display apparatus 100 may determine the P2P operating channel according to whether the portable device 200 is connected to the AP 300, whether the display apparatus 100 supports the RSDB, whether the portable device 200 supports the RSDB, and the like.

According to an exemplary embodiment, the display apparatus 100 includes a TV, and for the convenience of description, the portable device 200 is described as a peer device in FIG. 4.

In operation S410, the display apparatus 100 may be determined as a group owner GO and may be connected to the AP 300 by using the 5-GHz band.

In operation S420, the display apparatus 100 may determine an operating channel preferred by the portable device 200, based on a GO negotiation response message (e.g., a GO-NEG-RESP message) or an invitation request message (e.g., an INVITATION-REQ message) received from the portable device 200.

The GO negotiation response message or the invitation request message received from the portable device 200 may include device information.

In operation S420, the display apparatus 100 may parse a value of the device information of the portable device 200, which has been received from the portable device 200. For example, the device information may include a VSIE.

According to an exemplary embodiment, the display apparatus 100 may acquire the device information of the portable device 200 based on a parsed value of the VSIE of the portable device 200.

For example, the display apparatus 100 may determine, in the VSIE value, a value indicating whether the portable device 200 supports the RSDB and a value indicating whether the portable device 200 is connected to the AP 300, by parsing the value of the value of the VSIE of the portable device 200.

In operation S430, the display apparatus 100 may determine whether the display apparatus 100 supports the RSDB.

If it is determined in operation S430 that the display apparatus 100 supports the RSDB, the display apparatus 100 determines in operation S440 whether the portable device 200 does not support the RSDB and is connected to the AP 300 (whether VSIE==0x01; whether RSDB=0, and AP connected=1).

If it is determined in operation S430 that the display apparatus 100 does not support the RSDB, the display apparatus 100 may set a P2P operating channel as the 5-GHz band that is a channel to be used for a wireless connection between the display apparatus 100 and the AP 300, in operation S460.

Hereinafter, the channel to be used for a wireless connection between the display apparatus 100 and the AP 300 may be used as the same meaning as a channel preferred by the display apparatus 100.

If it is determined in operation S440 that the portable device 200 does not support the RSDB and is connected to the AP 300 (RSDB=0, and AP connected=1), the display apparatus 100 determines in operation S441 whether the portable device 200 is connected to the AP 300 by using 2.4 GHz.

If it is determined in operation S441 that the portable device 200 is connected to the AP 300 by using 2.4 GHz, the display apparatus 100 may set the P2P operating channel as the 2.4-GHz band that is a channel to be used for a wireless connection between the portable device 200 and the AP 300, in operation S443.

Hereinafter, the channel to be used for a wireless connection between the portable device 200 and the AP 300 may be used as the same meaning as a channel preferred by the portable device 200.

If it is determined in operation S441 that the portable device 200 is not connected to the AP 300 by using 2.4 GHz, the display apparatus 100 may set the P2P operating channel as the channel preferred by the display apparatus 100.

If it is determined in operation S440 that the portable device 200 does not correspond to the case in which the portable device 200 does not support the RSDB and is connected to the AP 300 (e.g., a case in which RSDB=0 and AP connected=0, a case in which RSDB=1 and AP connected=0, or a case in which RSDB=1 and AP connected=1), the display apparatus 100 determines in operation S450 whether the portable device 200 supports the RSDB and is connected to the AP 300 (whether VSIE==0x05; whether RSDB=1, and AP connected=1).

If it is determined in operation S450 that the portable device 200 supports the RSDB and is connected to the AP 300, the display apparatus 100 determines in operation S451 whether the portable device 200 is connected to the AP 300 by using 5 GHz and the channel to be used for a wireless connection between the portable device 200 and the AP 300 differs from the channel to be used for a wireless connection between the display apparatus 100 and the AP 300.

In FIG. 4, operation S450 is illustrated as being performed after operation S440, but operations S440 and S450 may occur at the same time. For example, the display apparatus 100 may determine whether the VSIE information of the portable device 200 indicates "VSIE==0x01" or "VSIE==0x05" at the same time.

If it is determined in operation S451 that the portable device 200 is connected to the AP 300 by using 5 GHz and the channel to be used for a wireless connection between the portable device 200 and the AP 300 differs from the channel to be used for a wireless connection between the display apparatus 100 and the AP 300, the display apparatus 100 may set the P2P operating channel as a default channel of the display apparatus 100 (e.g., 2.4-GHz band) in operation 453.

If it is determined in operation S451 that the portable device 200 does not correspond to the case in which the portable device 200 is connected to the AP 300 by using 5 GHz and the channel to be used for a wireless connection between the portable device 200 and the AP 300 differs from the channel to be used for a wireless connection between the display apparatus 100 and the AP 300, the display apparatus 100 may set the P2P operating channel as the channel preferred by the display apparatus 100 in operation S460.

If it is determined in operation S450 that the portable device 200 does not correspond to the case in which the portable device 200 supports the RSDB and is connected to the AP 300, the display apparatus 100 may set the P2P operating channel as the channel preferred by the display apparatus 100 in operation S460.

Hereinafter, a particular exemplary embodiment of a method of setting an operating channel between the display apparatus 100 and the portable device 200 when the display apparatus 100 is wirelessly connected to the AP 300 having an operating channel in the 5-GHz band will be described with reference to FIG. 5.

FIG. 5 is a particular example of an operating channel setting method when the display apparatus 100 is wirelessly connected to the AP 300 having an operating channel in the 5-GHz band, according to an exemplary embodiment.

The display apparatus 100 may determine a P2P operating channel according to whether the portable device (peer) 200 is connected to the AP 300, whether the display apparatus 100 supports the RSDB, and whether the portable device 200 supports the RSDB.

In detail, the display apparatus 100 may determine the P2P operating channel such that the occurrence of multi-channel concurrency (MMC) between the display apparatus 100 and the portable device 200 is minimized, and may preferably set 5 GHz as the P2P operating channel when the P2P operating channel at which the occurrence of MCC is minimized is 2.4 GHz and 5 GHz.

Reference numeral 510 indicates a case in which the portable device 200 is wirelessly connected to the AP 300 by using the same channel in the 5-GHz band as the display apparatus 100 (case 1-1).

In addition, reference numeral 520 indicates a case in which the portable device 200 is not connected to the AP 300 (case 1-2).

In addition, reference numeral 530 indicates a case in which the portable device 200 is wirelessly connected to the AP 300 by using the 2.4-GHz band (case 1-3).

In addition, reference numeral 540 indicates a case in which the portable device 200 is wirelessly connected to the AP 300 by using a channel (e.g., channel number 149) different from a channel (e.g., channel number 36) in the 5-GHz band used for a wireless connection for the display apparatus 100 and the AP 300 (case 1-4). In the reference numeral 540 of FIG. 5, the AP 300 connected to the display apparatus 100 and the AP 300 connected to the portable device 200 may or may not be connected to each other.

Reference numerals 511 and 513 of FIG. 5 indicate a P2P operating channel determined according to whether the display apparatus 100 and the portable device 200 support the RSDB under the condition of case 1-1.

The reference numeral 511 of FIG. 5 indicates a case in which both the display apparatus 100 and the portable device 200 do not support the RSDB, wherein the display apparatus 100 may set the P2P operating channel as the 5-GHz band. In this case, single channel concurrency (SCC) occurs in each of the display apparatus 100 and the portable device 200.

The reference numeral 513 of FIG. 5 indicates a case in which at least one of the display apparatus 100 and the portable device 200 supports the RSDB, wherein the display apparatus 100 may set the P2P operating channel as the 5-GHz band regardless of whether the display apparatus 100 and the portable device 200 support the RSDB. Referring to the reference numeral 513 of FIG. 5, SCC occurs in each of the display apparatus 100 and the portable device 200.

Reference numerals 521 and 523 of FIG. 5 indicate a P2P operating channel determined according to whether the display apparatus 100 and the portable device 200 support the RSDB under the condition of case 1-2.

The reference numeral 521 of FIG. 5 indicates a case in which both the display apparatus 100 and the portable device 200 do not support the RSDB, wherein the display apparatus 100 may set the P2P operating channel as the 5-GHz band. In this case, SCC occurs in the display apparatus 100.

The reference numeral 523 of FIG. 5 indicates a case in which at least one of the display apparatus 100 and the portable device 200 supports the RSDB, wherein the display apparatus 100 may set the P2P operating channel as the 5-GHz band regardless of whether the display apparatus 100 and the portable device 200 support the RSDB. In this case, SCC occurs in the display apparatus 100.

Reference numerals 531, 533, 535 and 537 of FIG. 5 indicate a P2P operating channel determined according to whether the display apparatus 100 and the portable device 200 support the RSDB under the condition of case 1-3.

The reference numeral 531 of FIG. 5 indicates a case in which both the display apparatus 100 and the portable device 200 do not support the RSDB, wherein the display apparatus 100 may set the P2P operating channel as the 5-GHz band. In this case, SCC occurs in the display apparatus 100, and MCC occurs in the portable device 200.

The reference numeral 533 of FIG. 5 indicates a case in which the display apparatus 100 does not support the RSDB and the portable device 200 supports the RSDB, wherein the display apparatus 100 may set the P2P operating channel as the 5-GHz band. In this case, SCC occurs in the display apparatus 100, and an RSDB connection occurs in the portable device 200.

The reference numeral 535 of FIG. 5 indicates a case in which the display apparatus 100 supports the RSDB and the portable device 200 does not support the RSDB, wherein the display apparatus 100 may set the P2P operating channel as the 2.4-GHz band. In this case, an RSDB connection occurs in the display apparatus 100, and SCC occurs in the portable device 200.

The reference numeral 537 of FIG. 5 indicates a case in which both the display apparatus 100 and the portable device 200 support the RSDB. The P2P operating channel and the occurrence of concurrency, which are determined in the reference numeral 537 of FIG. 5, may be the same as those in the reference numeral 533 of FIG. 5.

Reference numerals 541, 543 and 547 of FIG. 5 indicate a P2P operating channel determined according to whether the display apparatus 100 and the portable device 200 support the RSDB under the condition of case 1-4.

The reference numeral 541 of FIG. 5 indicates a case in which both the display apparatus 100 and the portable device 200 do not support the RSDB, wherein the display apparatus 100 may set the P2P operating channel as a channel (channel number 36) preferred by the display apparatus 100 in the 5-GHz band. In this case, SCC occurs in the display apparatus 100, and MCC occurs in the portable device 200.

The reference numeral 543 of FIG. 5 indicates a case in which one of the display apparatus 100 and the portable device 200 supports the RSDB. The P2P operating channel and the occurrence of concurrency, which are determined in the reference numeral 543 of FIG. 5, may be the same as those in the reference numeral 541 of FIG. 5.

The reference numeral 547 of FIG. 5 indicates a case in which both the display apparatus 100 and the portable device 200 support the RSDB, wherein the display apparatus 100 may set the P2P operating channel as the 2.4-GHz band. In this case, an RSDB connection occurs in the display apparatus 100 and the portable device 200.

Referring to the reference numerals 533, 535, 537, and 547 of FIG. 5, the occurrence of MCC may be reduced when a P2P operating channel is determined by considering whether the display apparatus 100 and the portable device 200 support the RSDB. Accordingly, a data transmission and reception rate according to a wireless connection may be improved than a case in which SCC and MCC occur.

Figure 6:
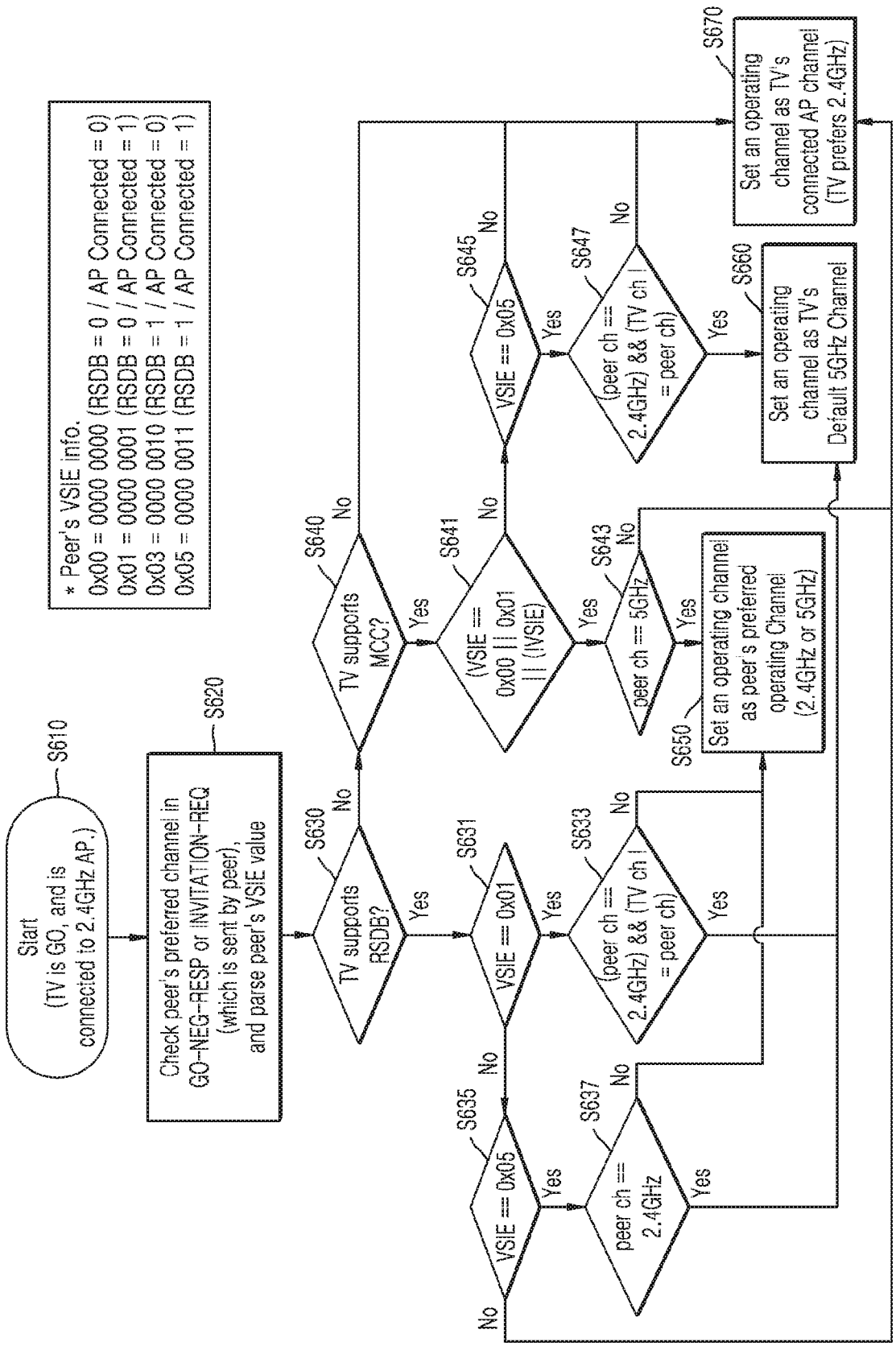
FIG. 6 is a flowchart of an operating channel setting method for the display apparatus 100, according to an exemplary embodiment.

FIG. 6 is a flowchart of an operating channel setting method for the display apparatus 100, according to an exemplary embodiment.

FIG. 6 illustrates a case in which a P2P operating channel between the display apparatus 100 and the portable device 200 is set when the display apparatus 100 is connected to the AP 300 having an operating channel in the 2.4-GHz band.

The display apparatus 100 may determine a P2P operating channel according to whether the portable device 200 is connected to the AP 300, whether the display apparatus 100 supports the RSDB, and whether the portable device 200 supports the RSDB.

In operation S610, the display apparatus 100 may be determined as a group owner GO and may be connected to the AP 300 by using the 2.4-GHz band.

In operation S620, the display apparatus 100 may determine an operating channel preferred by the portable device 200, based on an invitation request message or a GO negotiation response message received from the portable device 200.

The invitation request message or GO negotiation response message received from the portable device 200 may include device information.

In operation S620, the display apparatus 100 may parse a value of the device information of the portable device 200, which has been received from the portable device 200. For example, the device information may include a VSIE.

According to an exemplary embodiment, the display apparatus 100 may acquire the device information of the portable device 200 based on a parsed value of the VSIE of the portable device 200.

In operation S630, the display apparatus 100 may determine whether the display apparatus 100 supports the RSDB.

If it is determined in operation S630 that the display apparatus 100 supports the RSDB, the display apparatus 100 determines in operation S631 whether the portable device 200 does not support the RSDB and is connected to the AP 300 (whether RSDB=0, and AP connected=1).

If it is determined in operation S631 that the portable device 200 does not support the RSDB and is connected to the AP 300 (RSDB=0, and AP connected=1), the display apparatus 100 determines in operation S633 whether the portable device 200 is connected to the AP 300 by using 2.4 GHz and a channel to be used for a wireless connection between the portable device 200 and the AP 300 differs from a channel to be used for a wireless connection between the display apparatus 100 and the AP 300.

If it is determined in operation S633 that the portable device 200 is connected to the AP 300 by using 2.4 GHz and the channel to be used for a wireless connection between the portable device 200 and the AP 300 differs from the channel to be used for a wireless connection between the display apparatus 100 and the AP 300, the display apparatus 100 may set the P2P operating channel as a default channel of the display apparatus 100 (e.g., 5-GHz band) in operation 660.

If it is determined in operation S633 that the portable device 200 is not connected to the AP 300 by using 2.4 GHz or the channel to be used for a wireless connection between the portable device 200 and the AP 300 is the same as the channel to be used for a wireless connection between the display apparatus 100 and the AP 300, the display apparatus 100 may set the P2P operating channel as the channel preferred by the portable device 200, which is the channel to be used for a wireless connection between the portable device 200 and the AP 300, in operation S650.

If it is determined in operation S631 that the display apparatus 100 supports the RSDB or is not connected to the AP 300, the display apparatus 100 determines in operation S635 wherein the portable device 200 supports the RSDB and is connected to the AP 300 (whether RSDB=1, and AP connected=1).

If it is determined in operation S635 that the portable device 200 supports the RSDB and is connected to the AP 300 (RSDB=1, and AP connected=1), the display apparatus 100 determines in operation S637 whether the portable device 200 is connected to the AP 300 by using 2.4 GHz.

If it is determined in operation S637 that the portable device 200 is connected to the AP 300 by using 2.4 GHz, the display apparatus 100 may set the P2P operating channel as a default channel of the display apparatus 100 (e.g., 5-GHz band) in operation 660.

If it is determined in operation S637 that the portable device 200 is not connected to the AP 300 by using 2.4 GHz, the display apparatus 100 may set the P2P operating channel as the channel preferred by the portable device 200, which is the channel to be used for a wireless connection between the portable device 200 and the AP 300, in operation S650.

If it is determined in operation S635 that the portable device 200 does not support the RSDB (RSDB=0) or is not connected to the AP 300 (AP connected=0), the display apparatus 100 may set the P2P operating channel as a channel preferred by the display apparatus 100, which is the channel to be used for a wireless connection between the display apparatus 100 and the AP 300, in operation S670.

If it is determined in operation S630 that the display apparatus 100 does not support the RSDB, the display apparatus 100 determines in operation S640 whether the display apparatus 100 supports MCC.

If it is determined in operation S640 that the display apparatus 100 supports MCC, the display apparatus 100 determines in operation S641 whether the portable device 200 does not support the RSDB or the device information of the portable device 200 does not exist (e.g., a case in which RSDB=0 and AP connected=0, a case in which RSDB=0 and AP connected=1, or a case in which VSIE information does not exist).

If it is determined in operation S640 that the display apparatus 100 does not support MCC, the display apparatus 100 may set the P2P operating channel as the channel preferred by the display apparatus 100.

If it is determined in operation S641 that the portable device 200 does not support the RSDB (RSDB=0) or the device information of the portable device 200 does not exist, the display apparatus 100 determines in operation S643 whether the portable device 200 is connected to the AP 300 by using 5 GHz.

If it is determined in operation S643 that the portable device 200 is connected to the AP 300 by using 5 GHz, the display apparatus 100 may set the P2P operating channel as the channel preferred by the portable device 200 in operation S650.

If it is determined in operation S643 that the portable device 200 is not connected to the AP 300 by using 5 GHz, the display apparatus 100 may set the P2P operating channel as the channel preferred by the display apparatus 100 in operation S670.

If it is determined in operation S641 that the portable device 200 supports the RSDB and the device information of the portable device 200 exists, the display apparatus 100 determines in operation S645 whether the portable device 200 supports the RSDB and is connected to the AP 200 (whether RSDB=1 and AP connected=1).

If it is determined in operation S645 that the portable device 200 supports the RSDB and is connected to the AP 200 (RSDB=1 and AP connected=1), the display apparatus 100 determines in operation S647 whether the portable device 200 is connected to the AP 300 by using 2.4 GHz and the channel to be used for a wireless connection between the portable device 200 and the AP 300 differs from the channel to be used for a wireless connection between the display apparatus 100 and the AP 300.

If it is determined in operation S647 that the portable device 200 is connected to the AP 300 by using 2.4 GHz and the channel to be used for a wireless connection between the portable device 200 and the AP 300 differs from the channel to be used for a wireless connection between the display apparatus 100 and the AP 300, the display apparatus 100 may set the P2P operating channel as a default channel of the display apparatus 100 (e.g., 5-GHz band) in operation 660.

If it is determined in operation S647 that the portable device 200 is not connected to the AP 300 by using 2.4 GHz or the channel to be used for a wireless connection between the portable device 200 and the AP 300 is the same as the channel to be used for a wireless connection between the display apparatus 100 and the AP 300, the display apparatus 100 may set the P2P operating channel as the channel preferred by the display apparatus 100, which is the channel to be used for a wireless connection between the display apparatus 100 and the AP 300, in operation S670.

Hereinafter, a particular embodiment of a method of setting an operating channel between the display apparatus 100 and the portable device 200 when the display apparatus 100 is wirelessly connected to the AP 300 having an operating channel in the 2.4-GHz band will be described with reference to FIG. 7.

FIG. 7 is a particular example of an operating channel setting method when the display apparatus 100 is wirelessly connected to the AP 300 having an operating channel in the 2.4-GHz band, according to an embodiment.

Referring to FIG. 7, Reference numeral 710 indicates a case in which the portable device 200 is wirelessly connected to the AP 300 by using the same channel in the 2.4-GHz band as the display apparatus 100 (case 2-1).

In addition, reference numeral 720 indicates a case in which the portable device 200 is not connected to the AP 300 (case 2-2).

In addition, reference numeral 730 indicates a case in which the portable device 200 is wirelessly connected to the AP 300 by using the 5-GHz band (case 2-3).

In addition, reference numeral 740 indicates a case in which the portable device 200 is wirelessly connected to the AP 300 by using a channel (e.g., channel number 11) different from a channel (e.g., channel number 1) in the 2.4-GHz band used for a wireless connection for the display apparatus 100 and the AP 300 (case 2-4). In the reference numeral 740 of FIG. 7, the AP 300 connected to the display apparatus 100 and the AP 300 connected to the portable device 200 may or may not be connected to each other.

Reference numerals 711, 713, and 717 of FIG. 7 indicate a P2P operating channel determined according to whether the display apparatus 100 and the portable device 200 support the RSDB under the condition of case 2-1.

The reference numeral 711 of FIG. 7 indicates a case in which both the display apparatus 100 and the portable device 200 do not support the RSDB, wherein the display apparatus 100 may set the P2P operating channel as the 2.4-GHz band. In this case, SCC occurs in each of the display apparatus 100 and the portable device 200.

The reference numeral 713 of FIG. 7 indicates a case in which one of the display apparatus 100 and the portable device 200 supports the RSDB, and the P2P operating channel and the occurrence of concurrency, which are determined in the reference numeral 713 of FIG. 7, may be the same as those in the reference numeral 711 of FIG. 7.

The reference numeral 717 of FIG. 7 indicates a case in which both the display apparatus 100 and the portable device 200 support the RSDB, wherein the display apparatus 100 may set the P2P operating channel as the 5-GHz band. In this case, an RSDB connection occurs in each of the display apparatus 100 and the portable device 200.

Reference numerals 721, 723, and 727 of FIG. 7 indicate a P2P operating channel determined according to whether the display apparatus 100 and the portable device 200 support the RSDB under the condition of case 2-2.

The reference numeral 721 of FIG. 7 indicates a case in which both the display apparatus 100 and the portable device 200 do not support the RSDB, wherein the display apparatus 100 may set the P2P operating channel as the 2.4-GHz band. In this case, SCC occurs in the display apparatus 100.

The reference numeral 723 of FIG. 7 indicates a case in which the display apparatus 100 does not support the RSDB and the portable device 200 supports the RSDB, and the P2P operating channel and the occurrence of concurrency, which are determined in the reference numeral 723 of FIG. 7, may be the same as those in the reference numeral 721 of FIG. 7.

The reference numeral 727 of FIG. 7 indicates a case in which the display apparatus 100 supports the RSDB, wherein the display apparatus 100 may set the P2P operating channel as the 5-GHz band. In this case, an RSDB connection occurs in the display apparatus 100.

Reference numerals 731, 733, and 737 of FIG. 7 indicate a P2P operating channel determined according to whether the display apparatus 100 and the portable device 200 support the RSDB under the condition of case 2-3.

The reference numeral 731 of FIG. 7 indicates a case in which both the display apparatus 100 and the portable device 200 do not support the RSDB, wherein the display apparatus 100 may set the P2P operating channel as the 5-GHz band. In this case, MCC occurs in the display apparatus 100, and SCC occurs in the portable device 200.

The reference numeral 733 of FIG. 7 indicates a case in which the display apparatus 100 does not support the RSDB and the portable device 200 supports the RSDB, wherein the display apparatus 100 may set the P2P operating channel as the 2.4-GHz band. In this case, SCC occurs in the display apparatus 100, and an RSDB connection occurs in the portable device 200.

The reference numeral 737 of FIG. 7 indicates a case in which the display apparatus 100 supports the RSDB, wherein the display apparatus 100 may set the P2P operating channel as the 5-GHz band. In this case, an RSDB connection occurs in the display apparatus 100.

Reference numerals 741, 743, 745, and 747 of FIG. 7 indicate a P2P operating channel determined according to whether the display apparatus 100 and the portable device 200 support the RSDB under the condition of case 2-4.

The reference numeral 741 of FIG. 7 indicates a case in which both the display apparatus 100 and the portable device 200 do not support the RSDB, wherein the display apparatus 100 may set the P2P operating channel as the channel (channel number 1) preferred by the display apparatus 100 in the 2.4-GHz band. In this case, SCC occurs in the display apparatus 100, and MCC occurs in the portable device 200.

The reference numeral 743 of FIG. 7 indicates a case in which the display apparatus 100 does not support the RSDB and the portable device 200 supports the RSDB, wherein the display apparatus 100 may set the P2P operating channel as the 5-GHz band. In this case, MCC occurs in the display apparatus 100, and an RSDB connection occurs in the portable device 200.

The reference numeral 745 of FIG. 7 indicates a case in which the display apparatus 100 supports the RSDB and the portable device 200 does not support the RSDB, wherein the display apparatus 100 may set the P2P operating channel as the 5-GHz band. In this case, an RSDB connection occurs in the display apparatus 100, and MCC occurs in the portable device 200.

The reference numeral 747 of FIG. 7 indicates a case in which both the display apparatus 100 and the portable device 200 support the RSDB, wherein the display apparatus 100 may set the P2P operating channel as the 5-GHz band. In this case, an RSDB connection occurs in the display apparatus 100 and the portable device 200.

Figure 8:
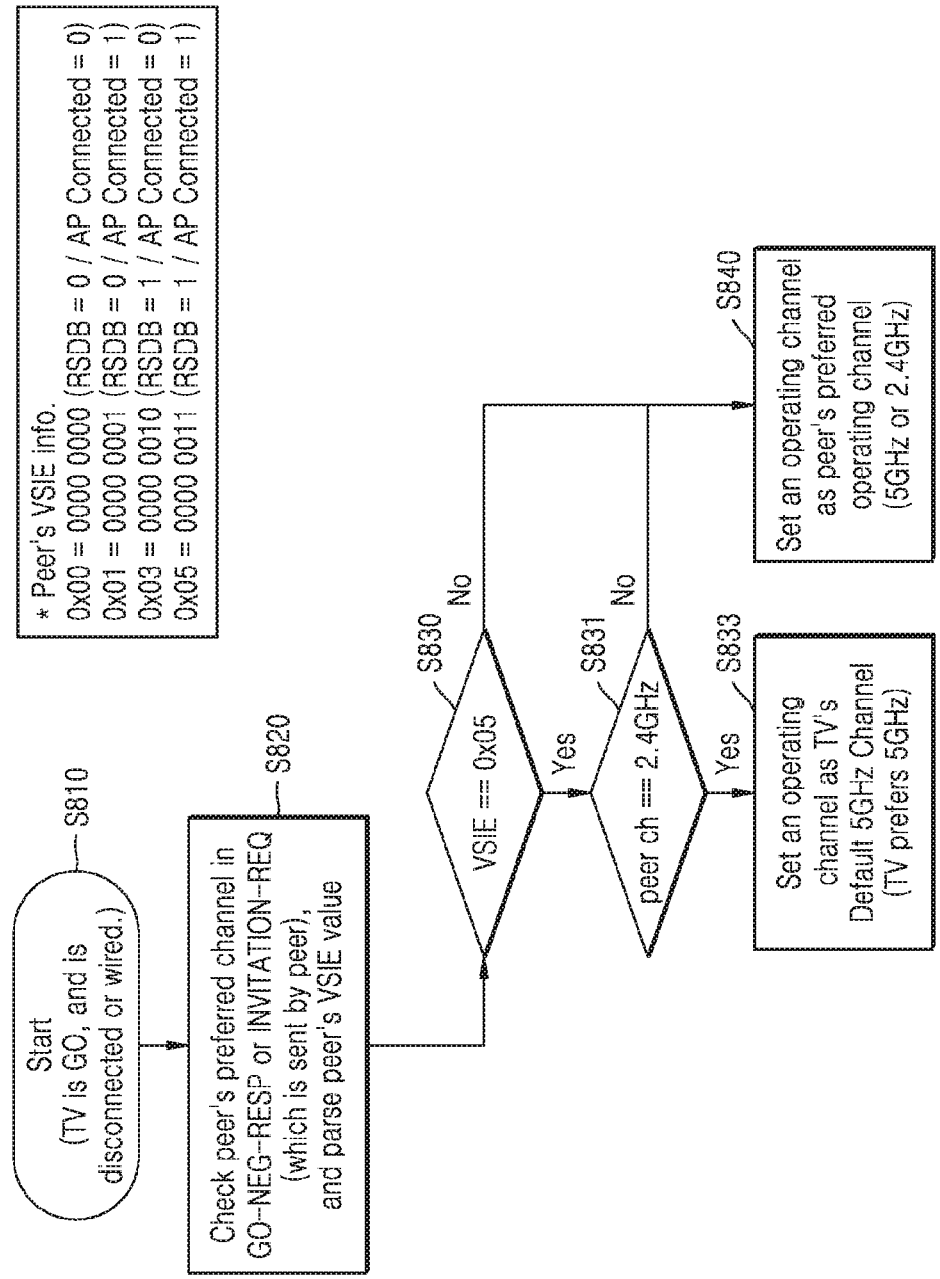
FIG. 8 is a flowchart of an operating channel setting method for the display apparatus 100, according to an exemplary embodiment.

FIG. 8 is a flowchart of an operating channel setting method for the display apparatus 100, according to an embodiment.

FIG. 8 illustrates setting a P2P operating channel between the display apparatus 100 and the portable device 200 when the display apparatus 100 is not wirelessly connected to the AP 300.

The display apparatus 100 may determine the P2P operating channel according to whether the portable device 200 is connected to the AP 300 and whether the portable device 200 supports the RSDB.

In operation S810, the display apparatus 100 may be determined as a group owner GO and may be connected to the AP 300 in a wired manner or may not be connected to the AP 300.

In operation S820, the display apparatus 100 may determine an operating channel preferred by the portable device 200, based on an invitation request message or a GO negotiation response message received from the portable device 200.

The invitation request message or GO negotiation response message received from the portable device 200 may include device information.

In operation S820, the display apparatus 100 may parse a value of the device information of the portable device 200, which has been received from the portable device 200. For example, the device information may include a VSIE.

According to an exemplary embodiment, the display apparatus 100 may acquire the device information of the portable device 200 based on a parsed value of the VSIE of the portable device 200.

In operation S830, the display apparatus 100 may determine whether the portable device 200 does not support the RSDB and is connected to the AP 300 (whether RSDB=0, and AP connected=1).

If it is determined in operation S830 that the portable device 200 does not support the RSDB and is connected to the AP 300 (RSDB=0, and AP connected=1), the display apparatus 100 determines in operation S831 whether the portable device 200 is connected to the AP 300 by using 2.4 GHz.

If it is determined in operation S831 that the portable device 200 is connected to the AP 300 by using 2.4 GHz, the display apparatus 100 may set the P2P operating channel at the 5-GHz band in operation S833.

If it is determined in operation S831 that the portable device 200 is not connected to the AP 300 by using 2.4 GHz, the display apparatus 100 may set the P2P operating channel as the channel preferred by the portable device 200, in operation S840.

If it is determined in operation S830 that the portable device 200 supports the RSDB or is not connected to the AP 300, the display apparatus 100 may set the P2P operating channel as the channel preferred by the portable device 200, in operation S840.

Hereinafter, a particular embodiment of a method of setting an operating channel between the display apparatus 100 and the portable device 200 when the display apparatus 100 is not wirelessly connected to the AP 300 will now be described with reference to FIG. 9.

FIG. 9 is a particular example of an operating channel setting method when the display apparatus 100 is not wirelessly connected to the access point 300, according to an embodiment.

Referring to FIG. 9, reference numeral 910 indicates a case in which the portable device 200 is wirelessly connected to the AP 300 by using the 5-GHz band (case 3-1).

In addition, reference numeral 920 indicates a case in which the portable device 200 is not connected to the AP 300 (case 2-2).

In addition, reference numeral 930 indicates a case in which the portable device 200 is wirelessly connected to the AP 300 by using the 2.4-GHz band (case 3-3).

Reference numerals 911 and 913 of FIG. 9 indicate a P2P operating channel determined according to whether the display apparatus 100 and the portable device 200 support the RSDB under the condition of case 3-1.

The reference numeral 911 of FIG. 9 indicates a case in which both the display apparatus 100 and the portable device 200 do not support the RSDB, wherein the display apparatus 100 may set the P2P operating channel as the 5-GHz band. In this case, SCC occurs in the portable device 200.

The reference numeral 913 of FIG. 9 indicates a case in which at least one of the display apparatus 100 and the portable device 200 supports the RSDB. The P2P operating channel and the occurrence of concurrency, which are determined in the reference numeral 913 of FIG. 9, may be the same as those in the reference numeral 911 of FIG. 9.

Reference numerals 921 and 923 of FIG. 9 indicate a P2P operating channel determined according to whether the display apparatus 100 and the portable device 200 support the RSDB under the condition of case 3-2.

The reference numeral 921 of FIG. 9 indicates a case in which both the display apparatus 100 and the portable device 200 do not support the RSDB, wherein the display apparatus 100 may set the P2P operating channel as the 5-GHz band.

The reference numeral 923 of FIG. 9 indicates a case in which at least one of the display apparatus 100 and the portable device 200 supports the RSDB, wherein the display apparatus 100 may set the P2P operating channel as the 5-GHz band.

Reference numerals 931, 933, 935 and 937 of FIG. 9 indicate a P2P operating channel determined according to whether the display apparatus 100 and the portable device 200 support the RSDB under the condition of case 3-3.

The reference numeral 931 of FIG. 9 indicates a case in which both the display apparatus 100 and the portable device 200 do not support the RSDB, wherein the display apparatus 100 may set the P2P operating channel as the 2.4-GHz band. In this case, SCC occurs in the portable device 200.

The reference numeral 933 of FIG. 9 indicates a case in which the display apparatus 100 does not support the RSDB and the portable device 200 supports the RSDB, wherein the display apparatus 100 may set the P2P operating channel as the 5-GHz band. In this case, an RSDB connection occurs in the portable device 200.

The reference numeral 935 of FIG. 9 indicates a case in which the display apparatus 100 supports the RSDB and the portable device 200 does not support the RSDB, wherein the display apparatus 100 may set the P2P operating channel as the 2.4-GHz band. In this case, SCC occurs in the portable device 200.

The reference numeral 937 of FIG. 9 indicates a case in which both the display apparatus 100 and the portable device 200 support the RSDB. The P2P operating channel and the occurrence of concurrency, which are determined in the reference numeral 937 of FIG. 9, may be the same as those in the reference numeral 933 of FIG. 9.

Under the conditions of the case 3-1, the case 3-2, and the case 3-3, a P2P operating channel may be determined according to whether the portable device 200 and the AP 300 are wirelessly connected, a channel used for the wireless connection, and whether the portable device 200 supports the RSDB, regardless of whether the display apparatus 100 supports the RSDB.

The methods according to the embodiments of the inventive concept may be implemented in the form of program instructions, which can be executed through various computer means, and recorded on a non-transitory computer-readable medium. The non-transitory computer-readable medium may include program commands, data files, data structures, and the like, taken alone or in combination. Examples of the non-transitory computer-readable medium may include volatile or nonvolatile storage media such as read-only memory (ROM), memories such as random access memory (RAM), memory chips, devices and integrated circuits, and storage media capable of magnetically or optically recording thereon and simultaneously reading therefrom by using a machine (e.g., a computer), such as compact discs (CDs), digital versatile discs (DVDs), magnetic discs, and magnetic tapes.

It may be understood that a memory which may be included in a portable device is an example of a machine-readable storage medium suitable for storing a program or programs including instructions for implementing the embodiments of the inventive concept. Program instructions recorded on the medium may be specially designed and configured for the inventive concept or well known and usable to those of ordinary skill in the art associated with computer software.

According to the disclosed embodiments, an optimal P2P operating channel between a display apparatus and a portable device may be set according to whether the display apparatus is connected to an access point, whether the portable device is connected to the access point, and whether the display apparatus and the portable device support an RSDB.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a communication interface wirelessly connected to at least one of a first access point and a portable device; and
   a memory storing one or more instructions; and
   a processor executing the one or more instructions stored in the memory to:
   receive device information of the portable device, which comprises first information about a wireless connection between the portable device and the first access point and second information about whether the portable device supports a real simultaneous dual band (RSDB) connection, from the portable device,
   transmit, to the portable device, a group owner negotiation request message or an invitation request message, which comprises an operating channel selected from among available channels of the display apparatus,
   receive, from the portable device, a group owner negotiation response message including an operating channel of the portable device,
   determine a peer-to-peer (P2P) operating channel between the display apparatus and the portable device based on identifying whether the display apparatus and the portable device support the RSDB connection by using device information of the display apparatus and the received device information of the portable device, and
   control the display apparatus to connect to the portable device through the determined P2P operating channel.

2. The display apparatus of claim 1, wherein the device information of the display apparatus comprising third information about a wireless connection between the display apparatus and the first access point and fourth information about whether the display apparatus supports the RSDB connection, and
wherein, the processor is further configured to:
identify whether the display apparatus and the portable device support the RSDB connection based on the second information and the fourth information, and
determine the peer-to-peer (P2P) operating channel between the display apparatus and the portable device further based on the first information and the third information.

3. The display apparatus of claim 2, wherein the display apparatus, the portable device, and the first access point are connected to each other through any one or any combination of a single channel concurrency, a multi-channel concurrency connection, and the RSDB connection, and
the processor is further configured to determine the P2P operating channel that minimizes a number of the multi-channel concurrency connection.

4. The display apparatus of claim 3, wherein operable channels of the display apparatus comprise a first frequency band and a second frequency band that is higher than the first frequency band, the processor is further configured to set the P2P operating channel as the second frequency band to minimize the number of the multi-channel concurrency connection.

5. The display apparatus of claim 4, wherein when the portable device is wirelessly connected to the first access point at the first frequency band and supports the RSDB connection, the processor is further configured to set the P2P operating channel as the second frequency band.

6. The display apparatus of claim 4, wherein the first frequency band corresponds to a 2.4-GHz band, and the second frequency band corresponds to a 5-GHz band.

7. The display apparatus of claim 1, wherein the first information includes an operating channel frequency band of the portable device, and an operating channel number of the portable device.

8. The display apparatus of claim 1, wherein the processor is further configured to set the display apparatus as a group owner based on the device information of the display apparatus and the device information of the portable device.

9. The display apparatus of claim 1, wherein the available channels comprise an available channel list stored in a storage, and when the display apparatus is connected to the first access point, an operating channel frequency band and an operating channel number.

10. An operating channel setting method for a display apparatus, the method comprising:
receiving device information of a portable device, which comprises first information about a wireless connection between the portable device and a first access point and second information about whether the portable device supports a real simultaneous dual band (RSDB) connection, from the portable device;
transmitting, to the portable device, a group owner negotiation request message or an invitation request message, which comprises an operating channel selected from among available channels of the display apparatus;
receiving, from the portable device, a group owner negotiation response message including an operating channel of the portable device;
determining a peer-to-peer (P2P) operating channel between the display apparatus and the portable device, based on identifying whether the display apparatus and the portable device support the RSDB connection by using device information of the display apparatus and the received device information of the portable device; and
controlling the display apparatus to connect to the portable device through the determined P2P operating channel.

11. The operating channel setting method of claim 10, wherein the device information of the display apparatus comprising third information about a wireless connection between the display apparatus and the first access point and fourth information about whether the display apparatus supports the RSDB connection,
wherein, the method further comprises identifying whether the display apparatus and the portable device support the RSDB connection based on the second information and the fourth information; and
the determining the peer-to-peer (P2P) operating channel between the display apparatus and the portable device is based on the first information and the third information.

12. The operating channel setting method of claim 11, wherein the display apparatus, the portable device, and the first access point are connected to each other through any one or any combination of a single channel concurrency connection, a multi-channel concurrency connection, and the RSDB connection, and
the determining the P2P operating channel comprises determining the P2P operating channel that minimizes a number of the multi-channel concurrency connection.

13. The operating channel setting method of claim 12, wherein operable channels of the display apparatus comprise a first frequency band and a second frequency band that is higher than the first frequency band, and
wherein the determining the P2P operating channel comprises determining the P2P operating channel at the second frequency band to minimize the number of multi-channel concurrency connection.

14. The operating channel setting method of claim 13, wherein the determining the P2P operating channel comprises determining the P2P operating channel as the second frequency band when the portable device is wirelessly connected to the first access point at the first frequency band and supports the RSDB connection.

15. The operating channel setting method of claim 13, wherein the first frequency band corresponds to a 2.4-GHz band, and the second frequency band corresponds to a 5-GHz band.

16. The operating channel setting method of claim 10, wherein the first information includes an operating channel frequency band of the portable device, and an operating channel number of the portable device.

17. The operating channel setting method of claim 10, wherein the determining the P2P operating channel comprises setting the display apparatus as a group owner based on the device information of the display apparatus and the device information of the portable device.

18. A non-transitory computer-readable storage medium storing a program that is executable by a computer to perform an operating channel setting method for a display apparatus, the method comprising:
receiving device information of a portable device, which comprises first information about a wireless connection between the portable device and a first access point and second information about whether the portable device supports a real simultaneous dual band (RSDB) connection, from the portable device;

transmitting, to the portable device, a group owner negotiation request message or an invitation request message, which comprises an operating channel selected from among available channels of the display apparatus;
receiving, from the portable device, a group owner negotiation response message including an operating channel of the portable device;
determining a peer-to-peer (P2P) operating channel between the display apparatus and the portable device, based on identifying whether the display apparatus and the portable device support the RSDB connection by using device information of the display apparatus and the received device information of the portable device; and
controlling the display apparatus to connect to the portable device through the determined P2P operating channel.

* * * * *